Dec. 1, 1964   M. F. PETERS   3,159,182
BELLOWS SEALING AND SECURING DEVICE
Filed Sept. 11, 1963   2 Sheets-Sheet 1

INVENTOR.
MELVILLE F. PETERS
BY Albert F. Kronman
ATTORNEY

Dec. 1, 1964   M. F. PETERS   3,159,182
BELLOWS SEALING AND SECURING DEVICE
Filed Sept. 11, 1963   2 Sheets-Sheet 2

INVENTOR.
MELVILLE F. PETERS
BY
ATTORNEY

United States Patent Office 3,159,182
Patented Dec. 1, 1964

3,159,182
BELLOWS SEALING AND SECURING DEVICE
Melville F. Peters, 29 N. Ridge Road, Livingston, N.J.
Filed Sept. 11, 1963, Ser. No. 308,219
8 Claims. (Cl. 138—30)

This invention relates to surge suppressors and particularly to replaceable fluid tight supporting structures for the flexible elements of surge suppressors.

The conventional surge suppressor consists of a rigid housing and a flexible element therein such as a bellows or diaphragm which divides the housing into a pressurized upper chamber and a lower chamber in communication with the fluid line or other source of fluid surges. Presently known devices employ large flanges on the housing and corresponding flanges on the flexible elements plus rings and other mechanical means to seal the flexible element to the housing. Such devices increase the overall diameters, are cumbersome, heavy, and make changing or replacing the flexible elements difficult or impossible.

Accordingly, it is an object of the present invention to provide a surge suppressor and a replaceable fluid tight supporting structure for the flexible elements.

A further object of the invention is to provide a fluid tight housing and supporting structure which provides for replacing and interchanging of the flexible element.

Another object of the present invention is to provide a housing and supporting structure for the flexible elements which will occupy a minimum amount of space and provide a highly effective seal.

Another object of the present invention is to provide a flexible element sealing and supporting structure which is adapted to both metal bellows and elastomer bellows.

An object of the present invention is to provide a replaceable fluid tight supporting structure which lends itself to easy removal and application to the surge suppressor housing.

The invention broadly consists of a plug which is secured in fluid tight engagement with the rigid housing of the surge suppressor and an adapter which is coupled to the plug and which in turn engages the flexible element and holds it in fluid tight contact with the plug.

The invention consists of the construction, combination and arrangement of parts, as herein illustrated, described and claimed.

In the accompanying drawings, forming a part hereof are illustrated several forms of embodiment of the invention, in which drawings similar reference characters designate corresponding parts, and in which.

Figure 1:
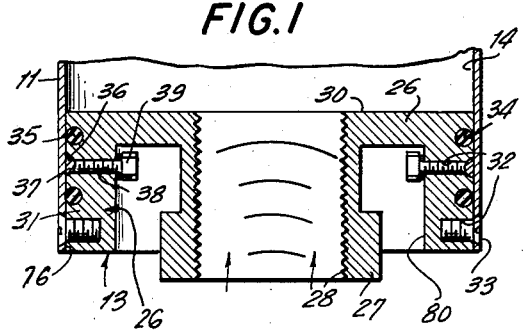
FIGURE 1 is a fragmentary view in vertical section of a surge suppressor showing the manner in which the sealing plug is secured to the walls of the housing according to the present invention.

Referring to the drawings and particularly to FIGURES 1, 2 and 4, 10 indicates a surge suppressor consisting of a rigid housing 11, a flexible element 12 therein and a sealing assembly 13, at the bottom of the housing 11.

The housing 11 consists of a rigid cylindrical body 14, and a dome-like closure 75 at the top thereof. The lower portion of the housing 11 is open as indicated at 76.

Figure 2:
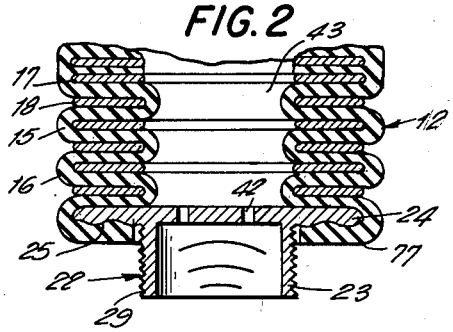
FIGURE 2 is a fragmentary vertical section of an elastomer bellows employed as the flexible element of a surge suppressor and an adapter secured to the lower end thereof.
Figure 4:
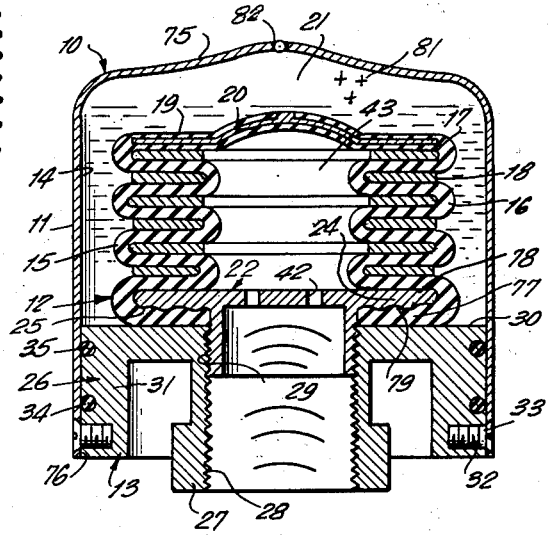
FIGURE 4 is a view in vertical section of a complete embodiment of a surge suppressor showing the manner in which an elastomer flexible element is secured by means of an adapter and plug to the rigid housing in accordance with the present invention.

The flexible element 12 illustrated in FIGURES 2 and 4, consists of an elastomer bellows 15 having a plurality of convolutions 16, which are supported by internal and external rings 17, 18. The top of the elastomer bellows 15 is closed by a dome-shaped cap 19, within which there is molded a rigid supporting member 20, for the purpose of preventing collapse of the elastomer bellows due to pressure within the pressurized chamber 21. Rings 17, 18 have three purposes; first, ring 17 prevents the large diameter edge of convolution 16 from turning in when the bellows is extended and the pressure acting on the outside surface of the bellows is greater than the pressure acting on the inside surface; second, ring 18 prevents the small diameter edge of convolution 16 from turning out when the bellows is extended and the pressure acting on the inside surface of the bellows is greater than the pressure acting on the outside surface and third, the rings distribute the force created by the compressed gases 81 in chamber 21 acting on dome 19 over the flat contacting surface walls of the nested bellows, so that the pressure developed at any region of the nested bellows will not be great enough to cause the elastomer to flow and be extruded from the stressed regions.

The purpose of rigid member 20 is to prevent the compressed gases 81 in chamber 21 from turning bellows 15 outside-in by forcing the dome shaped cap 19 through the interior of the bellows.

The bottom of the elastomer bellows 15 is open to admit fluid from the line (not shown) to which the surge suppressor is connected. An adapter 22 having a threaded cylindrical portion 23 and a flange-like top portion 24 is slipped between the base 77 and the first convolution of the elastomer bellows 15. The lower surface of the flange-like portion 24 is provided with an irregular elastomer locking surface 25 to increase the sealing area between the contacting surfaces 79 of bellows base 77 and flange 24 of adapter 22.

A fluid tight plug 26 is secured to the wall 14 of the housing 11 at the bottom thereof. The plug 26 has a somewhat cylindrical central portion 27 which is internally threaded as indicated at 28 to receive the externally threaded portion 23 of the adapter 22 at its upper end, and to receive a mating coupling from the line at the lower end. The base 77 of bellows 12 is compressed between the flange-like portion 24 of the adapter 22 and the top 30 of the plug 26, as the adapter 22 is threaded into the plug 26, as shown in FIGURE 4. Cement placed between surfaces 78, 79 will form a fluid tight seal between adapter 22 and the flexible element 12.

The top 30 of the plug 26 is provided with a depending annular flange 31 which is provided with threaded bores 32 to receive screws 33 which extend through the wall 14 of the housing 11. The screws 33 secure the plug 26 and the housing 11 together and are employed where the wall 14 of the housing is of relatively thin material.

Figure 5:
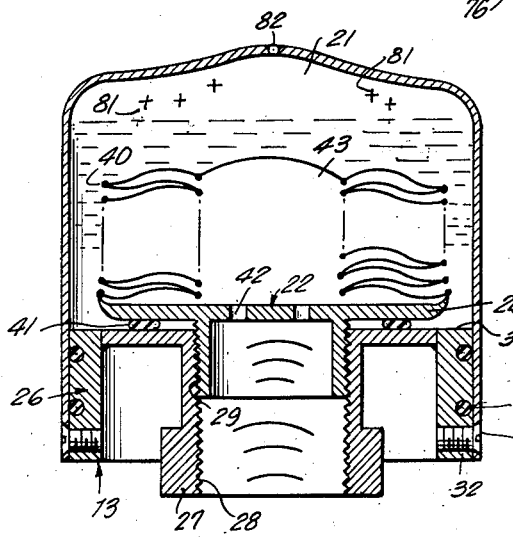
FIGURE 5 is a view similar to FIGURE 4 illustrating the manner in which a metal bellows may be substituted for the elastomer bellows of FIGURE 4.

In order for the surge suppressor to function satisfactorily over extended periods of use, it is necessary to provide a fluid tight seal between the plug 26 and the housing 11. Where the pressure within the chamber 29 is not excessive, and the sealing between plug 26 and housing 11 need not be the equivalent of welded or soldered surfaces, sealing may be accomplished by providing spaced annular grooves 34, in the plug 26, and slipping O rings 35 therein. Such a structure is illustrated in FIGURES 4 and 5. However, where the pressure in chamber 21 may be substantial, further sealing provision such as that illustrated in FIGURE 1 is necessary.

In FIGURE 1 there is shown in addition to the spaced O rings 35, an intermediate groove 36, in the plug 26. One or more bores 38 in plug 26 extend from surface 80 of the cylindrical portion 31 of plug 26 into the groove 36. The bores 38 are internally threaded to receive sealing screws 39. A quantity of some sealing material such as grease, a wax, a cement, an elastomer, a thermo-plastic or a low melting point metal 37 is forced into the groove 36 by way of the bores 38, one bore is usually allowed to remain open to allow trapped air to escape during the filling. When the groove 36 is filled with sealing material 37, the sealing screws 39 are inserted in bores 38 and the seal is complete.

Figure 3:
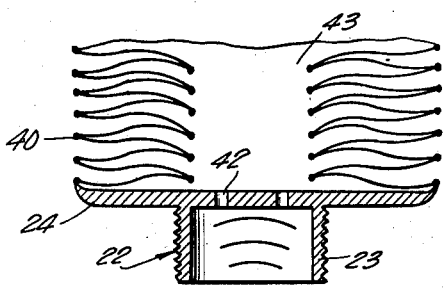
FIGURE 3 is a view in vertical section showing a portion of a metal bellows employed as a flexible element for a surge suppressor and the manner in which it is secured to an adapter in accordance with the present invention.

In FIGURE 3 there is shown an adapter 22 having a metal bellows 40 welded to the flange-like portion 24 thereof. By employing the sealing assembly 13 (shown in FIGURE 1) in accordance with the present invention, it is possible to substitute a metal bellows 40 for the elastomer bellows 15 where necessary. In substituting the metal bellows 40 the sealing arrangement shown in FIGURE 5 is employed in addition to that hereinabove described in conjunction with FIGURES 2 and 3. In this embodiment, a resilient ring 41 is interposed between the bottom of flange 24 of adapter 22 and the top 30 of the plug 26 for sealing purposes. As the adapter is screwed down into the plug 26 the ring 41 is compressed and a fluid tight seal achieved.

The flange-like portion 24 of the adapter 22 in FIGURES 2–5 is provided with openings 42 which serve a dual purpose of permitting the fluid to enter the interior of the flexible members 15, and 40 and also serves as a socket for a spanner or similar tool used for tightening the adapter within the plug 26. The openings serve as a restriction through which the fluid must pass in entering the interior of the flexible element. This restriction causes the fluid to enter chamber 43 in fine streams and reduces the impact forces acting on the flexible element during surges in the line. The reduction in intensity of the impact forces increases the life of the bellows, as well as dissipates the energy in the surging liquid so that the holes increase both the life and efficiency of the surge suppressor. Compressed fluids 81 are introduced into chamber 21 through an opening 82, after which the fluids are sealed into the chamber by welding or soldering a small metal insert in the opening.

Figure 6:
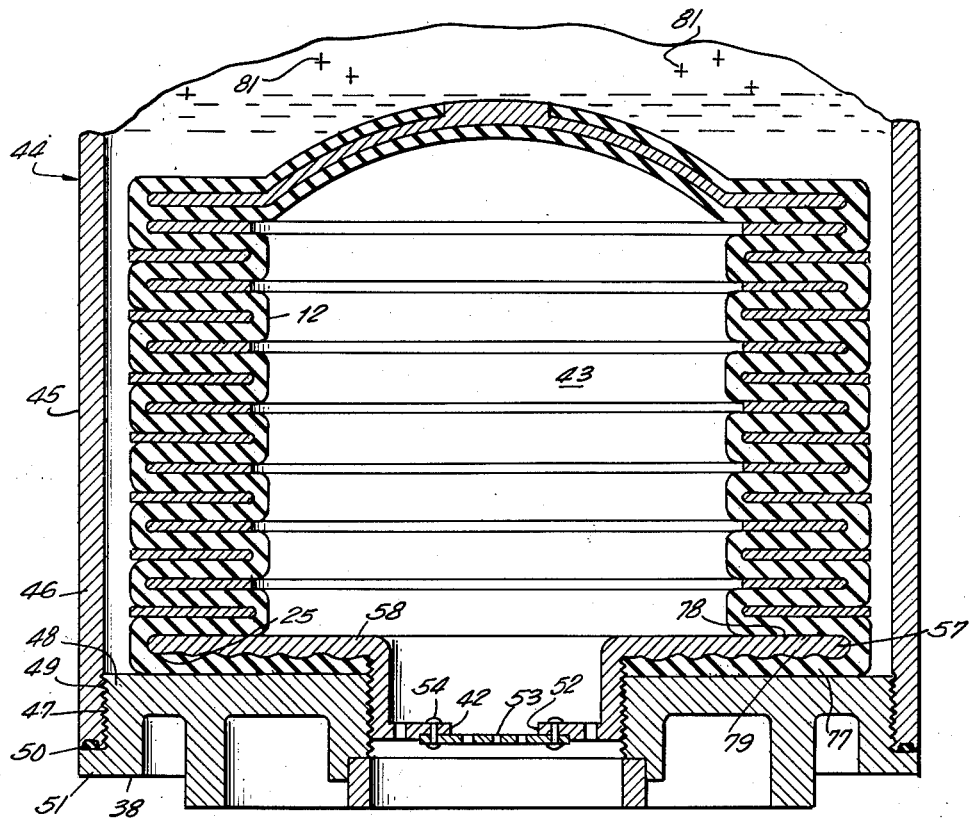
FIGURE 6 is a view in vertical section, somewhat enlarged, of a complete embodiment of the present invention showing the manner in which the flexible element is secured to a housing having a wall of substantial thickness.

Referring to FIGURE 6 there is shown a surge suppressor 44 in which the housing 45 is cast and has a substantially thicker wall 46 than that illustrated in FIGURES 1, 4 and 5. The thicker housing wall 46 is internally threaded as indicated at 47 and the sealing plug 48 is externally threaded as indicated at 49 to engage the threads 47 of the housing 45. A sealing ring 50, is interposed between the bottom of the housing wall 46 and a flange-like portion 51 extending outwardly from the sealing plug 48. When the plug 48 is screwed into the housing 45 the ring 50 is compressed and a highly efficient seal effected.

In this embodiment of the invention the adapter 58 is provided with a central opening 52 across which a screen 53 is secured by rivets 54. The screen serves the same purpose as openings 42 in adapters 22 in FIGURES 2–5, since they cause the fluid undergoing rapid changes in pressures to circulate slowly between chamber 86 and the line. A fine mesh screen is very efficient in dissipating the energy in the surging liquid and limiting the flow into and out of the chamber.

Adapter 58 has a flange 57 which is similar to flange 24 in adapter 22 in FIGURES 2 and 4. Bellows assembly 12 in FIGURE 6 is the same as bellows assembly 12 in FIGURES 2 and 4 and assembly 12 in FIGURE 6 is secured and sealed to plug 48 in the same manner as bellows assembly 12 in FIGURE 4 is secured and sealed to plug 26.

Fluids 81 under pressure are introduced into chamber 21 through the small opening of dome (not shown) of housing 45, after which the chamber is hermetically sealed by welding or soldering an insert therein as hereinabove set forth in the description of FIGURE 5.

In the event that the flexible element of the surge suppressor should become damaged it is merely necessary to remove the plugs 26, 48 hereinabove described, from the housings and replace the flexible elements. Where it is desired to substitute metal bellows for elastomer bellows the same housings can be used for either type by simply changing the adapters. Inspection of the flexible elements is also possible to determine their condition and the bellows thereafter replaced within a fluid tight seal compartment with a minimum difficulty.

From the foregoing it will be seen that there has been provided a highly efficient surge suppressor sealing structure capable of easy removal and interchangeability, which occupies a minimum amount of space and requires only relatively light structures for efficient sealing.

Having thus fully described the invention, what is claimed as new and desired to be secured by Letters Patent of the United States, is:

1. A fluid surge suppressor structure comprising a hollow fluid tight housing open at the bottom thereof, a sealing plug disposed across the housing opening and peripherally secured to the housing, an internally threaded bore in the plug communicating with the interior of the surge suppressor, an adapter, an externally threaded cylindrical portion on the adapter receivable within the threaded plug bore, an outwardly extending flange on the adapter, a flexible bellows member within the housing closed at one end and engaged by the flanged portion of the adapter at its other end and means to seal the plug, housing, adapter and bellows member at their contacting surfaces to form a fluid tight assembly.

2. A fluid surge suppressor structure comprising a hollow fluid tight housing open at the bottom thereof, a sealing plug disposed across the housing opening, a depending annular flange on the sealing plug peripherally secured to the housing, an internally threaded bore in the plug communicating with the interior of the surge suppressor, an adapter, an externally threaded cylindrical portion on the adapter receivable within the threaded plug bore, an outwardly extending flange on the adapter, a convoluted flexible bellows member within the housing closed at one end and engaged at its lowermost convolution by the flanged portion of the adapter at its other end and means to seal the plug, housing, adapter and bellows member at their contacting surfaces to form a fluid tight assembly.

3. A fluid surge suppressor structure comprising a hollow fluid tight housing open at the bottom thereof, a sealing plug disposed across the housing opening, a depending annular flange on the sealing plug peripherally secured to the housing, an internally threaded bore in the plug communicating with the interior of the surge suppressor, an adapter, an externally threaded cylindrical portion on the adapter receivable within the threaded plug bore, an outwardly extending flange on the adapter, a convoluted flexible bellows member within the housing closed at one end and engaged at its lowermost convolution by the flanged portion of the adapter at its other end and means including spaced O rings carried between the depending flange and the housing to seal the plug, housing, adapter and bellows member at their contacting surfaces to form a fluid tight assembly.

4. A fluid surge suppressor structure comprising a hollow fluid tight housing open at the bottom thereof, a sealing plug disposed across the housing opening, a depending annular flange on the sealing plug peripherally secured to the housing, an internally threaded bore in the plug communicating with the interior of the surge suppressor, an adapter, an externally threaded cylindrical portion on the adapter receivable within the threaded plug bore, an outwardly extending flange on the adapter, a convoluted flexible bellows member within the housing closed at one end and engaged at its lowermost convolution by the flanged portion of the adapter at its other end means including an annular groove in the surface of the depending flange adjacent the housing and a quantity of sealing material in said groove to seal the plug, housing, adapter and bellows member at their contacting surfaces to form a fluid tight assembly.

5. A device according to claim 4 in which the plug is provided with a plurality of threaded bores in communication with the annular groove and threaded screw members receivable within the said threaded bores.

6. A fluid surge suppressor structure comprising a hollow fluid tight housing open at the bottom thereof, a sealing plug disposed across the housing opening, a depending annular flange on the sealing plug peripherally secured to the housing, an internally threaded bore in the plug communicating with the interior of the surge suppressor, an adapter, an externally threaded cylindrical portion on the adapter receivable within the threaded plug bore, an outwardly extending flange on the adapter, a convoluted flexible bellows member within the housing closed at one end and engaged at its lowermost convolution by the flanged portion of the adapter at its other end and means including spaced O rings carried between the depending flange and the housing and an annular groove in the surface of the depending flange adjacent the housing and a quantity of sealing material in said groove to seal the plug, housing, adapter and bellows member at their contacting surfaces to form a fluid tight assembly.

7. A fluid surge supressor structure comprising a hollow fluid tight housing open at the bottom thereof, a sealing plug disposed across the housing opening and peripherally secured to the housing, an internally threaded bore in the plug communicating with the interior of the surge suppressor, an adapter, an externally threaded cylindrical portion on the adapter receivable within the threaded plug bore, an outwardly extending flange on the adapter, a flexible bellows member within the housing closed at one end and engaged by the flanged portion of the adapter at its other end and a resilient ring between the flanged portion of the adapter and the plug to form a fluid tight assembly.

8. A device according to claim 1 in which the flanged portion of the adapter and the top of the plug are provided with annular ribs which seat against one another to form a fluid tight seal.

References Cited in the file of this patent
UNITED STATES PATENTS

| | | |
|---|---|---|
| Re. 23,343 | Mercier et al. | Feb. 20, 1951 |
| 2,682,893 | Ziebold | July 6, 1954 |
| 2,710,630 | Greer | June 14, 1955 |
| 2,912,951 | Peters | Nov. 17, 1959 |
| 2,936,787 | Mercier | May 17, 1960 |
| 3,090,403 | Kroekel | May 21, 1963 |